(12) United States Patent
Suokas

(10) Patent No.: US 9,308,984 B2
(45) Date of Patent: Apr. 12, 2016

(54) FLYING DEVICE AND A WING CONSTRUCTION FOR THE SAME

(75) Inventor: Aki Suokas, Lahti (FI)

(73) Assignee: FLY NANO OY, Lahti (FI)

( * ) Notice: Subject to any disclaimer, the term of this patent is extended or adjusted under 35 U.S.C. 154(b) by 108 days.

(21) Appl. No.: 14/006,754

(22) PCT Filed: Mar. 19, 2012

(86) PCT No.: PCT/FI2012/050261
§ 371 (c)(1),
(2), (4) Date: Oct. 22, 2013

(87) PCT Pub. No.: WO2012/127108
PCT Pub. Date: Sep. 27, 2012

(65) Prior Publication Data
US 2014/0042277 A1    Feb. 13, 2014

(30) Foreign Application Priority Data
Mar. 21, 2011    (FI) ..................... 20115270

(51) Int. Cl.
*B64C 1/26* (2006.01)
*B64C 3/56* (2006.01)
*B64C 31/028* (2006.01)
*B64C 39/06* (2006.01)

(52) U.S. Cl.
CPC ... *B64C 1/26* (2013.01); *B64C 3/56* (2013.01); *B64C 31/028* (2013.01); *B64C 39/068* (2013.01)

(58) Field of Classification Search
CPC ............. B64C 1/26; B64C 3/10; B64C 3/56; B64C 39/068; B64C 31/028
See application file for complete search history.

(56) References Cited

U.S. PATENT DOCUMENTS

| | | | | |
|---|---|---|---|---|
| 2,147,968 A | * | 2/1939 | Delanne | 244/13 |
| 3,834,654 A | * | 9/1974 | Miranda | 244/13 |
| 3,981,460 A | * | 9/1976 | Ratony | 244/13 |
| 3,985,317 A | * | 10/1976 | Geraci et al. | 244/13 |
| 4,053,125 A | * | 10/1977 | Ratony | 244/46 |
| 4,146,199 A | * | 3/1979 | Wenzel | 244/45 R |
| 4,365,773 A | | 12/1982 | Wolkovitch | |
| 4,417,708 A | | 11/1983 | Negri | |
| 4,541,593 A | * | 9/1985 | Cabrol | 244/45 R |
| 4,591,114 A | * | 5/1986 | Block | 244/120 |
| 4,856,736 A | | 8/1989 | Adkins et al. | |
| 5,078,339 A | | 1/1992 | Lapidot | |

(Continued)

FOREIGN PATENT DOCUMENTS

| | | |
|---|---|---|
| DE | 3428168 | 2/1986 |
| DE | 3500575 | 7/1986 |
| WO | 2004074093 | 9/2004 |

OTHER PUBLICATIONS

International Search Report dated Jul. 16, 2012; corresponding to PCT/FI2012/050261.

(Continued)

*Primary Examiner* — Valentina Xavier
(74) *Attorney, Agent, or Firm* — Young & Thompson

(57) ABSTRACT

Flying device, in which there is a fuselage (2, 2'), wings (8, 9), which are connected to each other to form an essentially looped structure, elements (4, 5) for creating a flying force, and the desired elements (e.g., 7, 7') for controlling the flying device (1). The wings (8, 9) of the flying device (1) form a unified totality detachable from the fuselage (2, 2'). A wing construction is also included.

19 Claims, 4 Drawing Sheets

(56) References Cited

U.S. PATENT DOCUMENTS

| | | |
|---|---|---|
| 5,503,352 A | 4/1996 | Eger |
| 5,899,409 A * | 5/1999 | Frediani .......................... 244/13 |
| 6,098,923 A * | 8/2000 | Peters, Jr. ..................... 244/45 R |
| 6,626,398 B1 * | 9/2003 | Cox et al. ..................... 244/45 R |
| 6,840,478 B2 * | 1/2005 | Carr ............................ 244/45 R |
| D526,951 S * | 8/2006 | Houck, II ..................... D12/319 |
| 7,100,867 B2 * | 9/2006 | Houck, II ..................... 244/34 A |
| D598,838 S * | 8/2009 | Carr et al. .................... D12/319 |
| 2010/0051755 A1 | 3/2010 | Nichols et al. |
| 2010/0282917 A1 | 11/2010 | O'Shea |
| 2014/0158812 A1 * | 6/2014 | Luther .................... B64C 39/10 |
| | | 244/2 |

OTHER PUBLICATIONS

Finnish Office Action dated Jan. 12, 2012, corresponding to the Foreign Priority Application No. 20115270.

\* cited by examiner

FLYING DEVICE AND A WING CONSTRUCTION FOR THE SAME

BACKGROUND OF THE INVENTION

1. Technical Field of the Invention

The present invention relates to a flying device, and more specifically to an ultra-light flying device carrying a load of at most one person. The invention also relates to a wing construction to be used in the flying device.

Throughout history humans have had a strong desire to fly. Thus, a great many devices intended for flying, which can also be called aircraft, have been developed. In many situations, the development work has culminated in aerodynamics. In this field, properties that improve, for example, energy economy, have been created, especially with reference to professional aviation.

2. Description of Related Art

Development has also taken place in terms of flying devices equipped with propellor blades rotating around a vertical axis. In practice, this means flying devices, which can generally be referred to as helicopters. Very many different adaptations of 'personal' flying devices of this kind can also be found in the patent literature. Unfortunately, quite many of these are, however, based on theory, and often on misunderstood theory at that, and not on practice.

In terms of flight, one class of flying device are those operating without a separate power device. So-called hang gliders are a good example of this class. In order to take off, devices in this category require towing, or a high place from which gliding can commence.

Because the weight of small flying devices is an important factor relative to both use and also official regulations, attempts have been made to reduce weight in every way possible. The main ways are a reduction in size, or material selections, which allow sufficiently strong structures to be created with the least weight possible. Modern materials provide excellent opportunities for this.

When speaking of flying devices that are equipped with an apparatus developing a pushing force, and combining this with a small size and light weight, one factor is the easy portability of the device. On the one hand, this signifies a positive value, because the owner can take the device with them by using conventional means, such as normal-sized trailer for a car. On the other hand, this also signifies a negative side, in that the device cannot be left unwatched anywhere, because a thief can easily take the device, without requiring a crane or similar tools.

BRIEF SUMMARY OF THE INVENTION

The invention is indeed intended to create a flying device, which is sufficiently small and light to be able to be transported without great difficulty. An additional intention is to create a device, in which excellent properties in terms of use and portability have been achieved in an inventive and easy-to-use manner. The aim is also to achieve an inventive wing construction to be used in the flying device.

The aforementioned and other benefits and advantages of the invention are achieved in the manner described as characteristic in the accompanying claims.

BRIEF DESCRIPTION OF THE DRAWINGS

In the following, the invention is described in greater detail with reference to the accompanying drawings, which depict one well-regarded embodiment of the invention.

DETAILED DESCRIPTION OF THE INVENTION

The details of the wing construction will come clear in connection of the total construction of the flying device.

Figure 1:
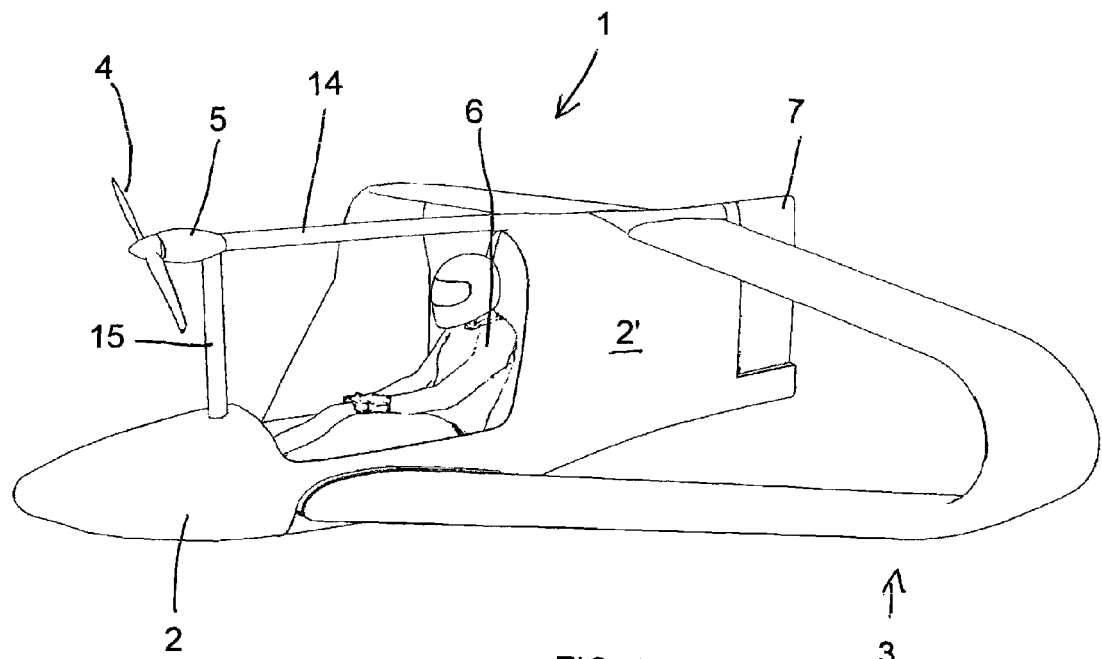
FIG. 1 shows an axonometric view of the flying device in flying condition.

The flying device shown in FIG. 1 is formed as follows. The basic components of the flying device 1 are a fuselage 2, 2' and wings 3. A pushing force is produced in a conventional manner by a propellor 4, which is rotated by a motor 5, which is shown here as, for example, an electric motor, which is driven with the aid of a power supply. The power supply is especially a battery, which is not marked here. In any event, the battery or batteries, or fuel tank in the event that the flying device is driven by a combustion engine, can be located in an appropriate manner by exploiting the suitable cavities of the flying device, such as the fuselage parts 2 or 2', or the boom 14 described later.

As can be seen from FIG. 1, the pilot 6 sits in a cockpit made for him, in which he has control devices for controlling the flying device, such as a joystick and possible control pedals, which are not draw in the figure. At its simplest, the 20 cockpit is an open seat recess in the fuselage.

Figure 2:
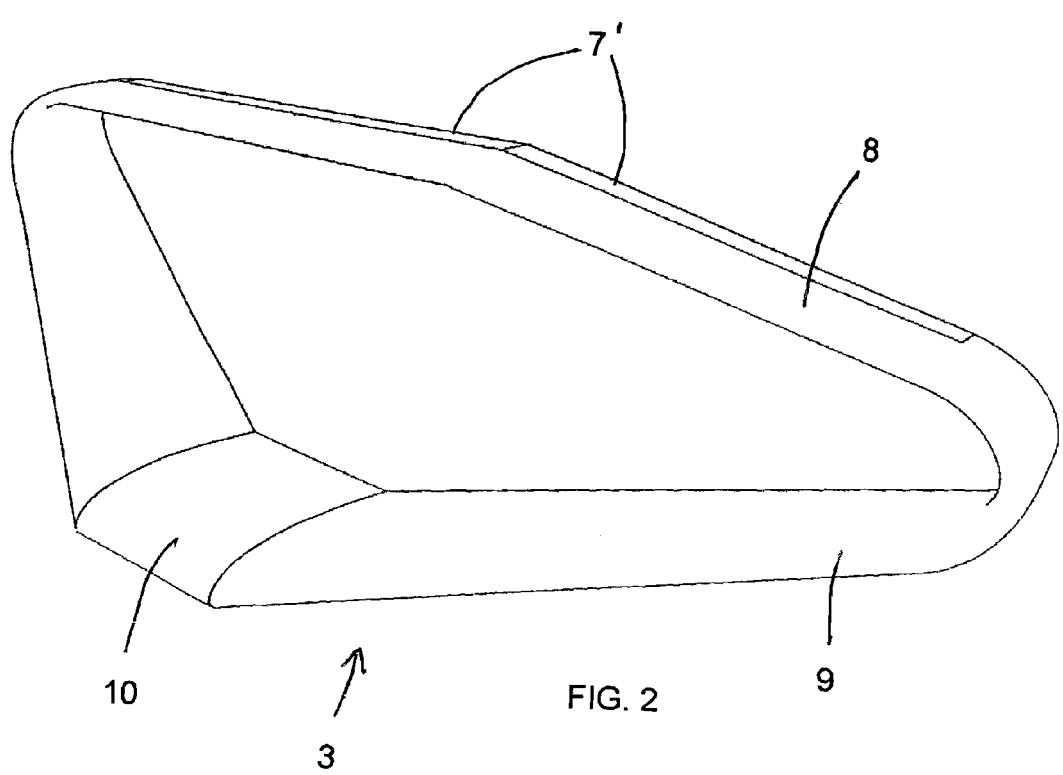
FIG. 2 shows the wing structure of the flying device according to FIG. 1, also as an axonometric image.

The flying device is controlled by means of various aileron solutions, of which the rudder 7 is clearly visible in FIG. 1. FIG. 2, for its part, shows schematically the ailerons 7' in the upper part of the wing structure 3, which, irrespective of the exceptional nature of the construction, can be called the upper wing 8. The details of the ailerons 7' will not be dealt with in greater depth here, because this area of the invention is conventional technology. The lower wing is marked with the reference number 9 and the flat portion, which lies against the fuselage structure, is marked with the reference number 10.

Figure 3:
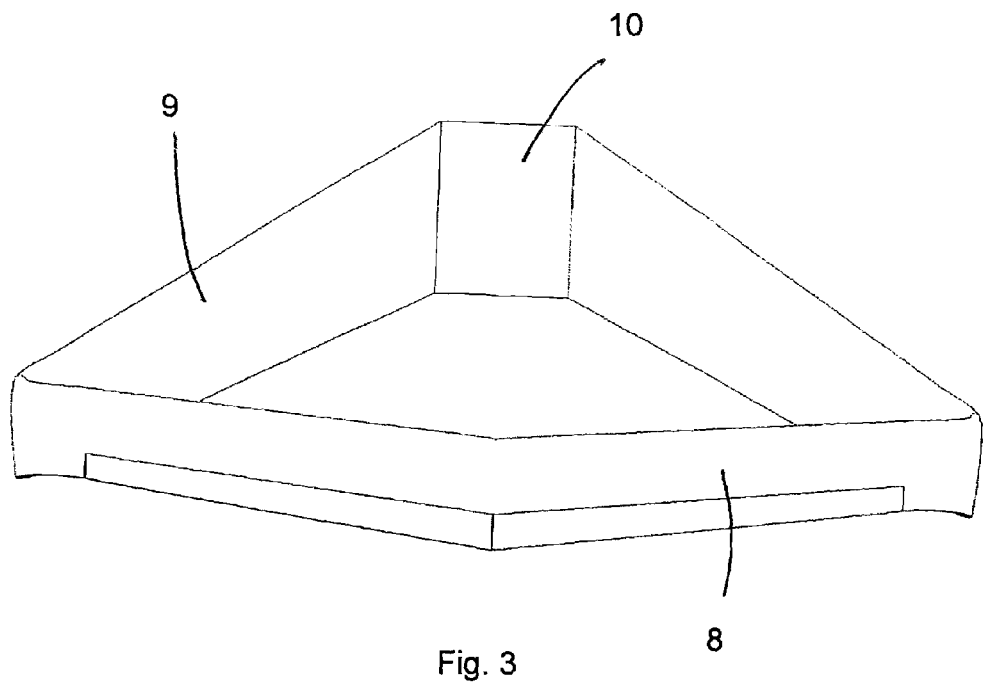
FIG. 3 shows the wing structure according to FIG. 2, seen from directly above.
Figure 4:
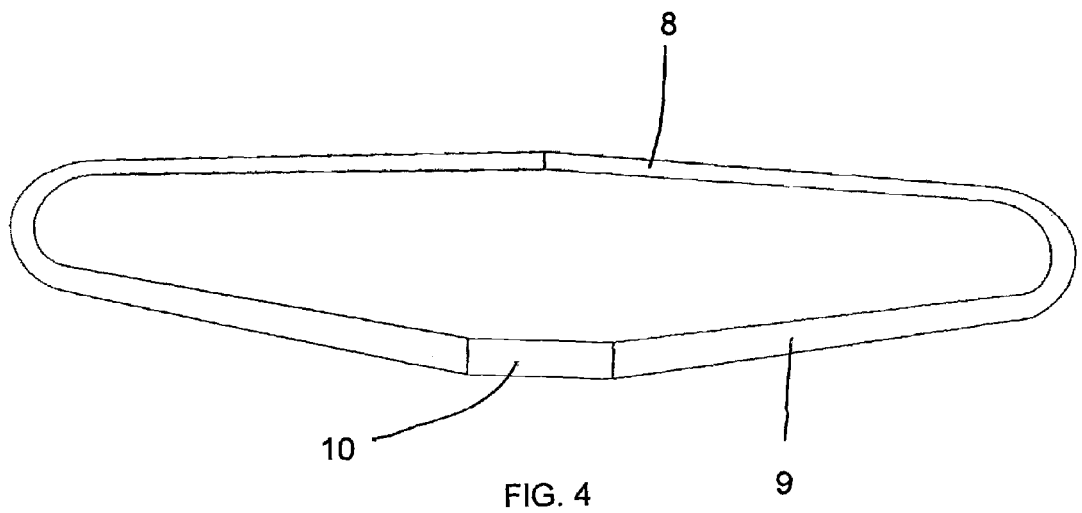
FIG. 4 for its part, shows the wing structure seen from directly in front.

It can be seen from FIG. 4 that, seen from straight in front, the upper wing 8 and the lower wing 9 form a unified closed loop structure. FIG. 3, for its part, shows one of the invention's characteristic features, i.e. that the lower wing 9 is swept strongly backwards as an arrow shape, which means that, when seen from directly above, the wings overlap each other over only a limited area in the tip area of the wings. This also plays an important part in relation to the detachability of the wings, described hereinafter. This is because, when the wings are rotated, a large gap is obtained, which permits the wings to be brought forward around the fuselage and away from the fuselage.

FIGS. 5-8 show the stages, in which the wing arrangement is detached from the fuselage. In this way, it is made possible for this ultra-light flying device to be transported using a conventional car trailer. The example of the flying device has an envisaged wing span of only about five meters. The fuselage has a maximum length of only somewhat over four meters. Thus, these two components, the fuselage and wings can, in terms of both their weight and dimensions, be packed onto a trailer and driven to the intended flight location, where the wings are attached to the fuselage and the device will be in flying condition immediately after. After the flight, it is easy to detach the wings and drive the device away.

Figure 5:
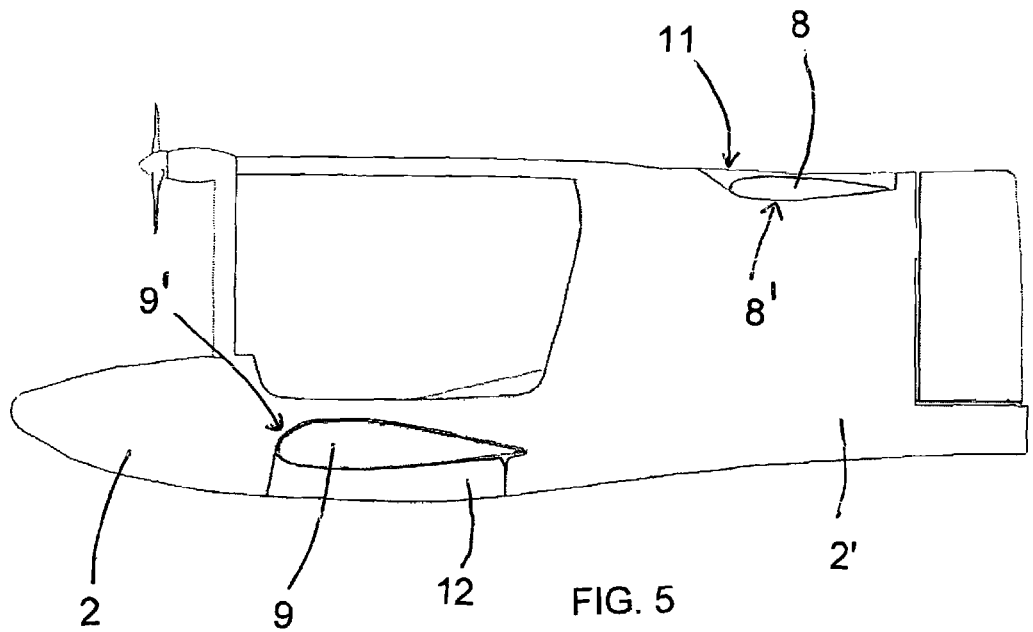
FIG. 5 shows the flying device according to the invention seen directly from the side, with the wings cut at roughly the fuselage line, in order to improve viewing.

FIG. 5 shows a side view of the flying device according to the invention, with the wings cut away at approximately the fuselage line, in order to open the views.

The important aspect is that the wings 8 and 9 are attached to the fuselage 2, 2' in such a way that it is easy to dismantle the attachment and to remove the wing structure from the fuselage as a totality. Thus, in the fuselage there are recesses 8' and 9' for the wings 8 and 9, the bottoms of which correspond essentially to the shapes of the surfaces of the wings. In this way, a tight and very secure joint is created between the wings and the fuselage. The recesses 8' and 9' can be seen best in FIG. 8.

The totality formed by the wings remains in place with the aid of separate locking pieces 11 and 12. The said pieces can be attached to the fuselage structures in such a way that they create suitable compression, pressing the wings 8 and 9 tightly into the recesses 8' and 9' in the fuselage. The attachment of the locking pieces 11 and 12 is arranged in such a way that the time required to detach them is as short as possible, i.e. some kind of quick-release locking is possible.

In the various sectors of technology, numerous different solutions exist for locking that can be quickly opened and closed again. For example, a solution can be used, in which a locking piece is pushed from one edge under a suitable tongue or similar, and the opposite edge is locked using, for example, a screw attachment.

Figure 6:
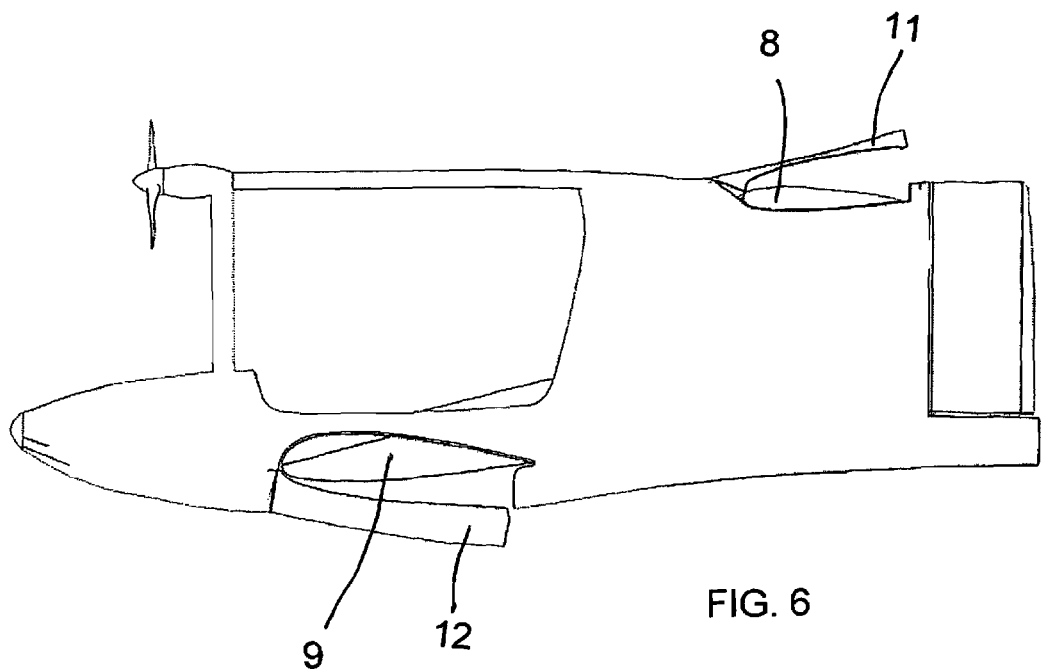
FIG. 6 shows the first stage of the detaching of the wing.
Figure 7:
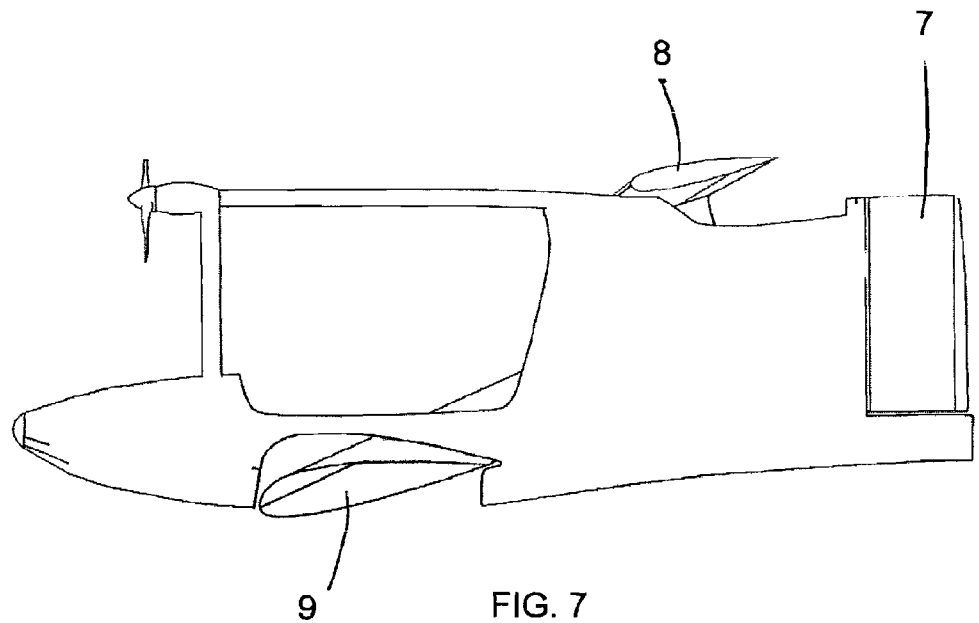
FIG. 7 shows the stage continuing from the situation in FIG. 6.
Figure 8:
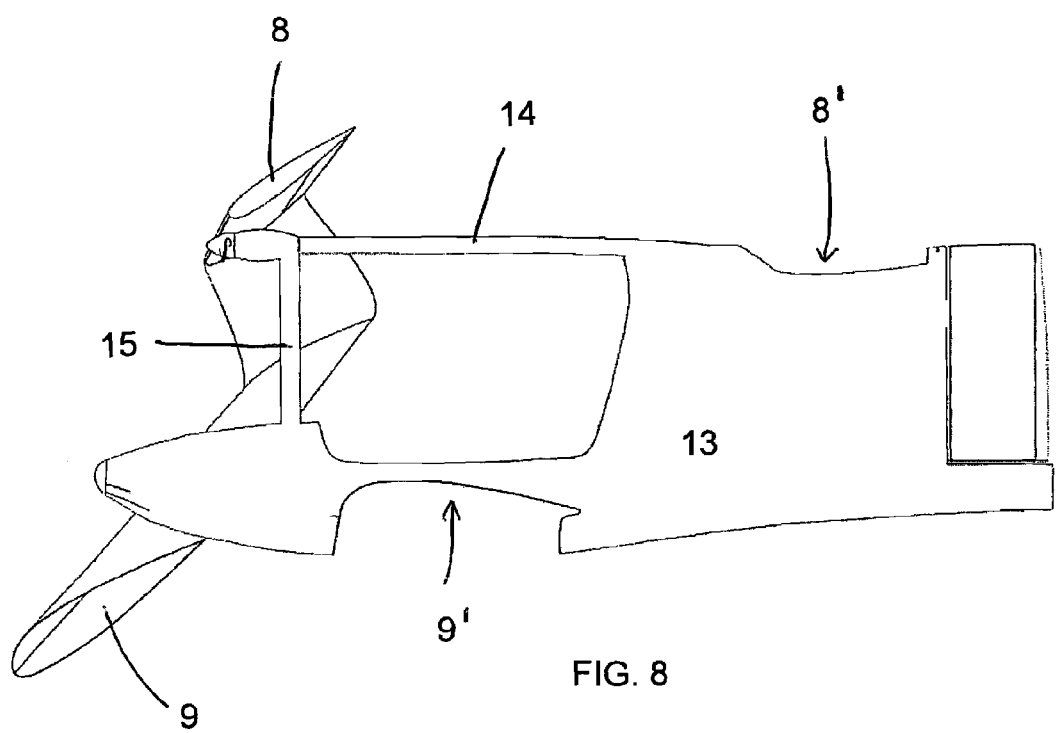
FIG. 8 shows the stage immediately before the wing is completely detached from the fuselage of the flying device.

FIGS. 6-8 show the stages of the detaching of the wings 8, 9. In FIG. 6, the locking pieces 11 and 12 are being detached from the fuselage. This is continued until the said pieces have been removed entirely. FIG. 7 shows how the rotation of the wings has been started and in FIG. 8 the situation is already one in which the wings have been rotated to a position, in which they are in the last stage before being finally detached from the fuselage.

As stated earlier, the construction of the wings, so as to create an arrow angle of a considerable size, makes their removal possible. As those skilled in the art will know, wings 8 and 9 that are aligned vertically over each other would not provide additional space in any relation, no matter what attempts would be made to rotate them, thus making the removal of the wings impossible. By using a construction, in which the wing 9 protrudes considerably forward, thus forming an arrow angle, rotation becomes possible and rotation in the manner shown in FIG. 8 will release the space between the wings, the exploitation of which will allow the wings to be moved forward around the fuselage.

FIG. 8 shows particularly a safety factor created by the invention seen, i.e. the corresponding slot or recess 13 at the trailing edge of the wing 9, in which the trailing edge of the wing 9 is located when the wings 8 and 9 are in place. It can clearly be seen from the figure that, by means of this construction, the wings cannot accidently detach, because detaching requires the release of both locking pieces 11 and 12 and additionally the wing 8 to rotate considerably forward, before the wing 9 can separate from the recess 13.

The reinstallation of the wings on the flying device naturally takes place in a sequence opposite to the removal sequence described above. In any event, the removal of the wings and setting them in place are operations that are rapid and, as such, easy to perform.

It should also be stated that, even though the removal and setting in place of the wings over the front part of the flying device is described in detail above, the movement of the wings can equally well take place over the rear of the device. In practice, the actual direction is selected, for example, according to where the fuselage is supported on the ground, or by other factors.

The pilot is protected and the structure reinforced by the supports 14 and 15, which can also, if necessary, act as channels for other needs. It is also possible to refer to booms, which are generally hollow structures that create the lightest structure possible, but one that is strong. For example, the booms/supports 14 and 15 can act to carry electrical conductors from the battery to the motor rotating the propellor, or for feeding fuel to the engine, or as previously stated, also as a location for the battery/fuel tanks. Many other requirements relating to the flying device's control and construction can be met by using the booms 14 and 15.

It is obvious, that numerous changes in appearance or operation can be made in one type of the invention, which is described above with reference to the drawings, while nevertheless remaining within the scope of protection of the basic idea of the invention and the accompanying Claims.

The invention claimed is:

1. A flying device, comprising:
   a fuselage having a longitudinal direction with a first side extending in the longitudinal direction, and an opposite, second side extending in the longitudinal direction, the fuselage comprising a cockpit that carries a load of one person that is a pilot of the flying device;
   wings detachably attached to the fuselage, the wings comprising a first side that extends from the first side of the fuselage, a second side that extends from the second side of the fuselage, and connecting portion that lies against and is detachably connected to a lower part of the fuselage, the connecting portion connecting an end part of the first side of the wings to an end part of the second side of the wings,
   wherein i) the first side of the wings comprises an upper wing part detachably attached to an upper part of the fuselage and a lower wing part attached to the connecting portion, and ii) the second side of the wings comprises an upper wing part detachably attached to an upper part of the second side of the fuselage and a lower wing part attached to the connecting portion, each of the first and second wing parts being spaced apart from each other, each of the first and second wing parts being connected by a respective wing tip part,
   wherein i) the first and second wing parts together with the respective wing tip part of the first side of the wings, ii) the first and second wing parts together with the respective wing tip part of the second side of the wings, and iii) the connecting portion together define a closed looped structure detachably attached to the respective upper and lower parts of the fuselage; and
   control devices that allow the pilot to control the flying device.

2. The flying device according to claim 1, wherein the fuselage further comprises an upper recess having a bottom corresponding to a shape of the upper wing parts and a lower recess having a bottom corresponding to a shape of the connecting portion.

3. The flying device according to claim 2, further comprising locking pieces that lock the wings into the upper and lower recesses.

4. The flying device according to claim 1, wherein the lower wing parts are rearwardly swept.

5. The flying device according to claim 2, wherein trailing edge of the lower wing parts locked into the upper recess.

6. The flying device according to claim 1, wherein a free distance between the upper and lower wing parts of the wings is sufficient for moving the wings as a whole and in one piece around the fuselage.

7. The flying device according to claim 3, wherein the locking pieces are quick-release locks.

8. The flying device according to claim 1, wherein the flying device further comprises a motorized propeller.

9. The flying device according to claim 1, further comprising ailerons located in a back edge of each of the upper wing parts.

10. The flying device according to claim 1, wherein the connecting portion is a flat portion that facilitates fastening of the wings to the fuselage.

11. The flying device according to claim 1, wherein, when released from the fuselage, the wings are pivotable such that wings may be moved along the longitudinal direction over the fuselage from a rear part of the fuselage to a forward-most part of the fuselage with the upper wing parts remaining over the upper part of the fuselage and the connecting portion remaining below the lower part of the fuselage.

12. The flying device according to claim 1, further comprising:
a rudder located at a rear part of the fuselage, the rudder controlled by the control devices,
aileron located in each of the upper wing parts, each said aileron controlled by the control devices,
a motor,
a propeller driven by the motor, and
a boom extending from a rear of the motor to the fuselage, wherein,
each said wing tip portion is arcuate and defines an arcuate path from the upper wing part to the lower wing part,
the lower wing parts are each rearwardly swept such that the upper wing parts extend further to the rear part of the fuselage than the lower wing parts extend to the rear part of the fuselage such that, when seen from directly above, the upper and lower wing parts vertically overlap each other over only a limited area of the arcuate wing tip part, and
the cockpit is within the fuselage such that the pilot's head being located below the boom.

13. The flying device according to claim 1, further comprising:
a rudder located at a rear part of the fuselage, the rudder controlled by the control devices,
aileron located in each of the upper wing parts, each said aileron controlled by the control devices,
a battery-powered electric motor,
a propeller driven by the motor, and
a boom extending from the motor to the fuselage, wherein,
each said wing tip portion is arcuate and defines an arcuate path from the upper wing part to the lower wing part,
the lower wing parts are each rearwardly swept such that the upper wing parts extend further to the rear part of the fuselage than the lower wing parts extend to the rear part of the fuselage such that, when seen from directly above, the upper and lower wing parts vertically overlap each other over only a limited area of the arcuate wing tip part, and
the cockpit is an open seat recess in the fuselage with the pilot's head being located below the boom.

14. The flying device according to claim 1, further comprising:
a rudder controlled by the control devices,
aileron located in each of the upper wing parts, each said aileron controlled by the control devices,
a motor,
a propeller driven by the motor, and
a boom extending from a rear of the motor to the fuselage, wherein,
each said wing tip portion is arcuate and defines an arcuate path from the upper wing part to the lower wing part,
the lower wing parts are each rearwardly swept such that the upper wing parts extend further to the rear part of the fuselage than the lower wing parts extend to the rear part of the fuselage such that, when seen from directly above, the upper and lower wing parts vertically overlap each other over only a limited area of the arcuate wing tip part, and
the cockpit is within the fuselage such that the pilot's head being located below the boom.

15. The flying device according to claim 1, further comprising:
a rudder controlled by the control devices,
aileron located in each of the upper wing parts, each said aileron controlled by the control devices,
a motor,
a propeller driven by the motor, and
the lower wing parts are each rearwardly swept such that the upper wing parts extend further to the rear part of the fuselage than the lower wing parts extend to the rear part of the fuselage such that, when seen from directly above, the upper and lower wing parts vertically overlap each other over only a limited area of the wing tip part.

16. The flying device according to claim 15, wherein, when released from the fuselage, the wings are pivotable such that wings may be moved along the longitudinal direction over the fuselage from a rear part of the fuselage to a forward-most part of the fuselage and over the motor and propeller, with the upper wing parts remaining over the upper part of the fuselage and the connecting portion remaining below the lower part of the fuselage.

17. The flying device according to claim 15, wherein each said wing tip portion is arcuate and defines an arcuate path from the upper wing part to the lower wing part.

18. A flying device, comprising:
a fuselage having a longitudinal direction with a first side extending in the longitudinal direction, and an opposite, second side extending in the longitudinal direction, the fuselage comprising a cockpit that carries a load of one human pilot; and
wings detachably attached to the fuselage, the wings comprising a first side that extends from the first side of the fuselage, a second side that extends from the second side of the fuselage, and connecting portion that lies against and is detachably connected to a lower part of the fuselage, the connecting portion connecting an end part of the first side of the wings to an end part of the second side of the wings,
wherein i) the first side of the wings comprises an upper wing part and a lower wing part attached to the connecting portion, and ii) the second side of the wings comprises an upper wing part and a lower wing part attached to the connecting portion, each of the first and second wing parts being spaced apart from each other, each of the first and second wing parts being connected by a respective wing tip part,
wherein i) the first and second wing parts together with the respective wing tip part of the first side of the wings, ii) the first and second wing parts together with the respective wing tip part of the second side of the wings, and iii) the connecting portion, together define a closed looped structure detachably attached to the respective upper and lower parts of the fuselage; and control devices that allow the pilot to control the flying device.

19. The flying device according to claim 17, wherein each said wing tip portion is arcuate and defines an arcuate path from the upper wing part to the lower wing part.

* * * * *